B. OWEN.
MOTOR VEHICLE LOCK.
APPLICATION FILED NOV. 9, 1920.
1,399,514.
Patented Dec. 6, 1921.
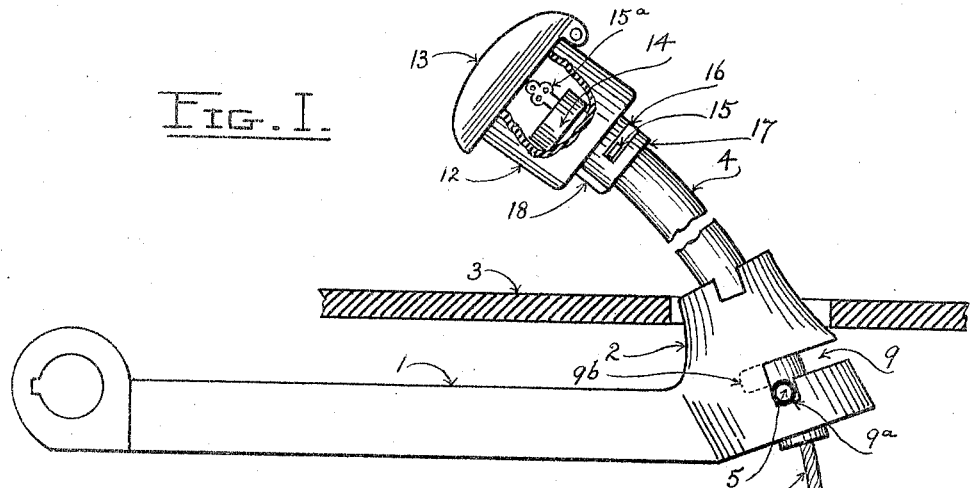
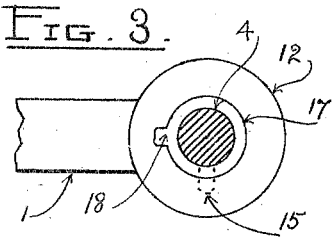
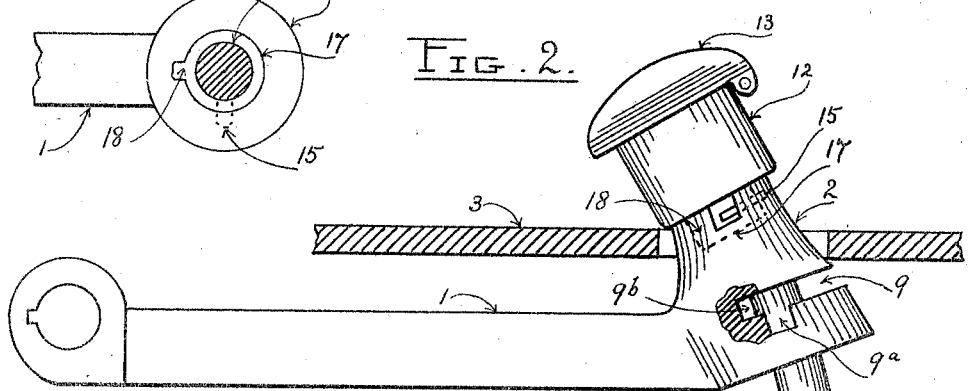
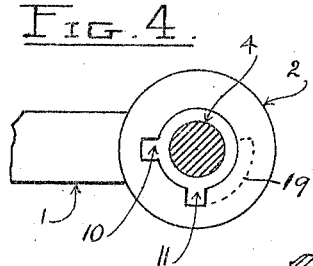
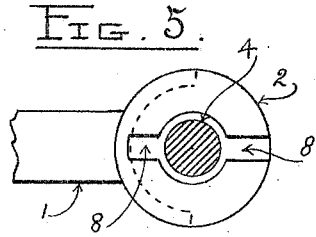
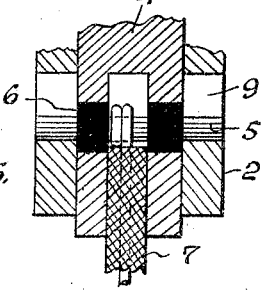
Brice Owen
INVENTOR.
By _____
ATTORNEY.

UNITED STATES PATENT OFFICE.

BRICE OWEN, OF LOS ANGELES, CALIFORNIA.

MOTOR-VEHICLE LOCK.

1,399,514.   Specification of Letters Patent.   Patented Dec. 6, 1921.

Application filed November 9, 1920. Serial No. 422,830.

*To all whom it may concern:*

Be it known that I, BRICE OWEN, a citizen of the United States, residing at the city of Los Angeles, county of Los Angeles, State of California, have invented new and useful Improvements in Motor-Vehicle Locks, of which the following is a specification.

My invention relates particularly to a simple and effective means for preventing the operation of a motor vehicle by an unauthorized person, and the object thereof is to lock the clutch pedal so that it can not be operated and to at the same time open the circuit of the sparking device so that the cylinders can not be operated.

In the drawings forming a part of this application Figure 1 is a side elevation partly in section showing my device applied to a motor vehicle portions of which are shown. Fig. 2 is a like view showing the parts of my device in locked position. Fig. 3 is a bottom plan of the pedal head. Fig. 4 is a top plan of the clutch lever head. Fig. 5 is a bottom plan of the clutch lever head. Fig. 6 is an enlarged sectional detail showing the connection of the clutch shaft, pedal shaft and wire when in operative position.

Referring to the drawings 1 is the usual clutch lever which is mounted on the clutch shaft, not shown, by means of which the clutch of the machine, not shown, is operated. Lever 1 has a head 2 that normally extends into an aperture in the floor 3 of the vehicle. Head 2 has a vertical hole extending therethrough, through which pedal shaft 4 can slide. Shaft 4 has a metal pin 5 which is insulated by insulation 6 from the shaft. The lower end of shaft 4 is hollow and insulated ground wire 7 projects into this hollow and is electrically connected to pin 5. The other end of wire 7 is electrically connected to the sparking circuit of the machine. In the bottom of head 2 is a vertical slot 8 which extends upwardly and opens into transverse slot 9 and groove 9$^b$. Slot 9 has a vertical bottom pocket 9$^a$ in which pin 5 normally rests when the parts are unlocked and in operative position as shown in Fig. 1. An internal groove 9$^b$ in head 2 opposite slot 9 permits the rotation of shaft 4 when pin 5 is raised out of pocket 9$^a$. In the top of head 2 are vertical grooves 10 and 11. On the top of shaft 4 is pedal head 12 having a hinged cover 13 secured thereto. A lock 14 having a key 15$^a$ is mounted in the pedal head. To the bottom of the lock tumbler is secured a locking bolt 15 which is movable in slot 16 of boss 17 on the bottom of head 12. Boss 17 has a lug 18 on one side thereof.

With the parts in position as shown in Fig. 1 the machine is operated in the usual manner. Now should the driver desire to stop his machine and leave it locked he raises shaft 4 to bring pin 5 out of slot 9$^a$. He then rotates shaft 4 a quarter turn which brings pin 5 into register with slot 8. He then pushes shaft 4 down through head 2 until lug 18 enters slot 10 and at the same time bolt 15 enters slot 11 and heads 2 and 12 engage as shown in Fig. 2. He then raises lid 13 and inserts key 15$^a$ in the lock and turns the tumbler to locking position. This movement of the tumbler causes bolt 15 to travel in groove 19 shown in dotted lines in Fig. 4 and heads 2 and 12 are securely locked together and the clutch lever can not be operated. The sparking circuit is also open and locked.

Having described my invention I claim:

1. In a motor vehicle having a clutch the combination of a clutch lever having a head with a vertical hole therethrough and a vertical slot opening through the end of the head and grooves opening through the top of the head and connected with the vertical hole and a groove extending from one of said grooves within said head and a slot extending from and at right angles to the vertical hole through to the end of the head and a pocket opening downwardly from said last slot; a pedal shaft slidable through said vertical hole and having a hole extending from the lower end thereof a distance upwardly; a metal pin extending through said shaft, said pin being insulated from said shaft; a wire extending into said shaft and electrically connected to said pin and insulated from said shaft; a head on the top of said shaft having a slot opening therefrom, a lock in said head having the locking bolt adapted to pass into the clutch lever head and to be turned into a groove therein to lock the head to the lever.

2. In a motor vehicle the combination of a clutch lever and a pedal shaft slidable therein; and a lock in said shaft adapted to lock said shaft to said lever when in an inoperative position, said lever and shaft having coacting parts whereby when in one position the sparking circuit is open and in other position the sparking circuit is closed.

In witness that I claim the foregoing I have hereunto subscribed my name this 3rd day of November, 1920.

BRICE OWEN.